United States Patent [19]

Hayden

[11] Patent Number: 4,567,853
[45] Date of Patent: Feb. 4, 1986

[54] ANIMAL CARRIER APPARATUS

[76] Inventor: Dave A. Hayden, Rte. 101, Baker, Mont. 59313

[21] Appl. No.: 642,881

[22] Filed: Aug. 21, 1984

[51] Int. Cl.⁴ .......................... A61D 3/00; B62B 13/16
[52] U.S. Cl. ..................................... 119/102; 119/103; 280/19
[58] Field of Search .................. 119/102, 103; 280/19, 280/20, 24

[56] References Cited

U.S. PATENT DOCUMENTS

| | | | |
|---|---|---|---|
| 68,534 | 9/1867 | Shaaber | 280/20 |
| 1,487,941 | 3/1924 | Hammett | 119/103 |
| 3,621,819 | 11/1971 | Hooper | 119/103 |
| 4,132,427 | 1/1979 | McGee | 280/19 |

Primary Examiner—Hugh R. Chamblee
Attorney, Agent, or Firm—Arthur L. Urban

[57] ABSTRACT

Animal carrier apparatus including a base portion, an animal support portion, a locking portion and a towing portion; the base portion including a pair of frame members, each frame member having a generally quadrangular configuration with upper and lower horizontal sections and end sections joining same, the frame members being pivotally connected to one another, the pivotal connection being along the end sections of the frame members, the pivotal connection being at the same respective location on each end section, the pivotal connection enabling the frame members to be pivoted substantially parallel to each other for compact storage; the animal support portion including spaced transverse strips extending between the upper sections of the frame members and spaced longitudinal strips crossing with the transverse strips, restraining mechanism operatively connected to the crossed strips; the locking portion including mechanism for maintaining the frame members in a spread configuration with the transverse strips in an extended condition; the towing portion including a connector extending from forward ends of the frame members; whereby an animal's legs can be inserted through spaces between the crossed strips with its body held by the restraining mechanism and the locking portion maintaining the frame members spread so the connector can be utilized to tow the animal.

7 Claims, 4 Drawing Figures

U.S. Patent     Feb. 4, 1986     4,567,853
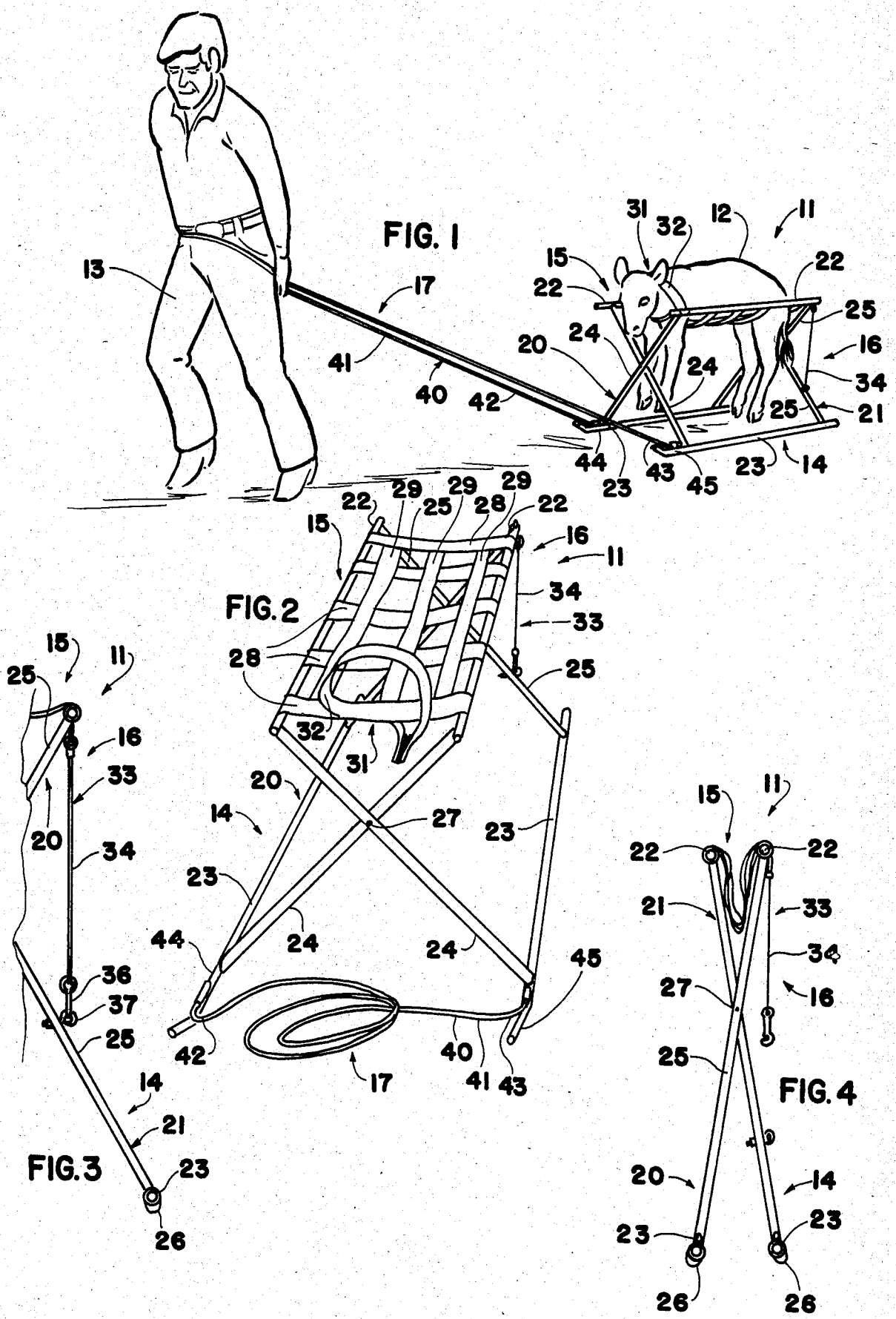

ANIMAL CARRIER APPARATUS

This invention relates to a novel animal apparatus and more particularly relates to a new apparatus for transferring animals.

Throughout history, loads have been carried in a wide variety of ways. Originally, man carried loads in his arms or on his back. Later, after animals had been domesticated, such creatures were employed to carry loads. In situations in which it was not feasible to carry the loads on the back of a man or an animal, loads were carried on devices such as sleds, wagons and the like that were pulled by man or an animal.

With the discovery of internal combustion engines, society has developed vehicles such as trucks to haul loads and cargo. However, in some certain cases, the use of motorized vehicles or cargo carriers is not feasible or desirable. One such situation is the handling of newborn calves.

Calves be born in a field at some distance from barns or other buildings. If the calf requires special attention or treatment, the owner is faced with a choice of treating the animal in the field or bringing it back to a barn or other facility.

It the owner treats the calf in the field, he has to contend with adverse weather conditions. Also, the ground may be wet or snow convered so that treatment may be more diffcult to perform. In addition, the mother cow may interfere with the treatment in an attempt to be close to her baby.

An alternative is to lift the calf onto the back of a pickup truck so the calf will be in a more convenient position. However, the person doing the treating still has to contend with adverse weather conditions and interference by the mother.

Taking the calf back to a building in the pickup for treatment may allow treatment out of the weather, but is not without its own problems. If the calf is removed completely from the mother, the cow may not take the calf back when it is returned and the calf may have to be cared for as an orphan.

From the above discussion, it is clear that present and past procedures for treating calves leaves much to be desired. Thus, there is a need for a new means for caring for calves which overcomes the deficiencies of previous methods.

The present invention provides a novel apparatus for handling calves that has features and advantages not found with earlier procedures. The animal carrier apparatus of the present invention simplifies the handling of newborn calves. The apparatus of the invention facilitates the treatment of animals both in the field and/or the transfer thereof to a nearby building if the weather is inclement.

The carrier apparatus of the invention enables a person to transfer a calf or other animal safely without risk of injury to the person or to the animal. The apparatus allows the mother to follow closely so that she will maintain contact with her baby.

The carrier apparatus holds the animal securely so the user can direct his full attention to moving the animal. The apparatus restrains the animal tightly so injuries or illness are not compounded during the transfer.

The sled apparatus of the invention is simple in design and can be produced relatively inexpensively. The apparatus can be fabricated from commerically available materials and components. Conventional metal fabricating techniques and procedures can be utilized in its manufacture.

The apparatus can be used efficiently by farm and ranchhands after a minimum of instruction. Animals can be loaded onto the apparatus simply and quickly. The apparatus can be opened for use easily.

The carrier apparatus of the invention is durable in construction and has a long useful life. Little if any maintenance is required to keep the apparatus in good working condition.

The apparatus can be used on a variety of animals in addition to calves. For example, dogs, cats, sheep, colts, etc. also can be transferred successfully. In addition, the apparatus can be utilized to haul other loads such as hay, animal feed, firewood, wild game and the like.

The animal carrier apparatus can be towed over different surfaces such as snow, mud, grass, gravel, rocks and the like. The apparatus can be towed by hand or with a vehicle or a horse if desired.

These and other benefits and advantages of the novel animal carrier apparatus of the present invention will be apparent from the following description and the accompanying drawings in which:

FIG. 1 is a view in perspective of one form of animal carrier apparatus of the invention in use;

FIG. 2 is an enlarged view in perspective of the animal carrier apparatus shown in FIG. 1;

FIG. 3 is fragmentary view of the locking portion of the animal carrier apparatus shown in FIGS. 1 and 2; and FIG. 4 is a side view of the animal carrier apparatus shown in FIG. 2 in a folded position.

As shown in the drawings, one form of the novel animal carrier apparatus 11 of the present invention has an animal such as a calf 12 strapped thereon. The carrier is being towed by a person 13. The animal carrier 11 includes a base portion 14, an animal support portion 15, a locking portion 16 and a towing portion 17.

The base portion 14 of the animal carrier 11 of the present invention includes a pair of frame members 20 and 21. The frame members 20 and 21 have a generally quadrangular configuration. Each frame member includes an upper horizontal section 22, a lower horizontal section 23 and end sections 24 and 25 joining the upper and lower sections.

Advantageously, the end sections join the upper and lower sections adjacent the ends thereof. The frame members preferably have a rectangular configuration with the upper and lower horizontal sections being longer than the ends sections. The frame member sections advantageously are formed of tubing. The lower frame sections 23 preferably include runner sections 26 along the undersides thereof. The runners may be integrally formed with the lower sections.

The frame members 20 and 21 ar3 pivotally connected to one another. The pivotal connection is along the end sections 24 and 25 of the frame members. The pivotal connections are at the same location on each end section. The frame members advantageously are pivotally connected through pins 27 that extend through corresponding points along the adjoining end sections.

The animal support portion 15 of the carrier apparatus 11 of the invention includes spaced transverse strips 28 and spaced longitudinal strips 29. The strips 28 and 29 preferably are flexible strips such as plastic or fabric webbing. The transverse strips 28 extend between the upper sections 22 of the frame sections 20 and 21. The longitudinal strips 29 cross or are interconnected with the transverse strips 28, preferably with a slidable interconnection or interlacing.

The width of the strips 28 and 29 advantageously is significantly greater than the thickness thereof. The support portion 15 preferably includes a greater number of transverse strips 28 than the longitudinal strips 29 interlaced therewith. Advantageously, the transverse strips 28 that extend between the upper frame sections 22 are of different lengths to conform with an animal's underbody.

The spacing between the transverse strips advantageously is significantly greater than the width of the longitudinal strips. Likewise, the spacing between the longitudinal strips is significantly greater than the width of the transverse strips. This construction provides open areas of significant size between the crossing strips as will be described hereinafter.

Restraining means 31 also is included in the animal support portion 15. The restraining means is operatively connected to the interlaced strips 28 and 29. Preferably, the restraining means 31 includes an animal encircling strap 32 that may include fastening means such as hooked fabric patches or a buckle.

The locking portion 16 of the animal carrier 11 includes means 33 for maintaining the frame members 20 and 21 in a spread configuration with the transverse strips 28 in an extended condition. Advantageously, the locking portion as shown in the drawings includes a selectively engageable elongated flexible member 34. The elongated member 34 preferably includes a cable or rope, one end of which is secured to one frame member 20 and the other end includes a snap 36 that is engageable with an eye 37 on the end section 25 of the other frame member 21.

The towing portion 17 of the carrier apparatus 11 of the invention includes connector means 40. The connector means 40 extends from the forward ends of the frame members 20 and 21. Advantageously, the towing portion includes continuous flexible connector means shown as cable or rope 41. The ends 42 and 43 of the rope 41 preferably are affixed to the formed ends 44 and 45 of the lower frame sections 23.

The animal carrier apparatus of the present invention may be constructed of any of a wide variety of materials. The frame members may be formed of wood, plastic, metal and combinations thereof, with metal tubing being preferred. The strips 28 and 29 may be flexible fabric or plastic webbing such as seat belt material or the like.

In the use of the novel animal carrier apparatus 11 of the invention as shown in the drawings, the folded apparatus (FIG. 4) is removed from its storage location. The folded apparatus 11 is opened by moving the frame members 20 and 21 into a spread configuration as shown in FIGS. 1 and 2 with the transverse strips 28 in an extended condition. Next, snap 36 of cable 34 hanging from frame member 20 is attached to eye 37 in end section 25 of the opposite frame member 21. The carrier now is ready for use.

A calf 12 or other animal is lifted to a position above the carrier with animal's legs extending downwardly. The calf then is lowered toward the animal support portion 15 while allowing the legs to slide into openings between the transverse strips 28 and the longitudinal strips 29. The animal's body is lowered until it rests on the support portion. Thereafter, the restraining strap 32 is placed around the body and secured.

The user then can tow the carrier with the animal secured thereon by grasping the rope 41 that extends from the forward ends of the lower frame sections 23. The mother cow can follow closely behind the carrier and thus maintain contact with her baby. Alternatively, the carrier may be towed behind a vehicle or a horse. In any case, the carrier allows the mother to be close by so both the calf and the mother are relaxed and not overly anxious.

If it is desired to treat the calf in the field, the treatment can be accomplished easily and quickly on the carrier and the calf then lifted off and returned to its mother. After the calf has been treated, whether it is in the field or at a remote location, the carrier may be folded again for storage after separating the snap 36 from the eye 37.

The above description and the accompanying drawings show that the present invention provides a novel animal carrier apparatus with features and advantages not present in previous devices. The animal carrier apparatus of the invention simplifies the handling of calves and other animals. The apparatus facilitates treatment of animals both in the field and/or the transfer of the animals to a nearby building if necessary.

The animal carrier holds the animal securely and thus minimizes the risk of injury to the animal or persons involved. Furthermore, the mother may follow closely so that she does not become anxious or abandon the animal when it is returned to her.

The animal carrier apparatus of the invention is simple in design and can be manufactured relatively inexpensively using conventional metal fabricating procedures. The apparatus is durable in construction and requires little if any maintenance.

The apparatus can be used efficiently after only a minimum of instruction. Animals can be loaded and unloaded simply and quickly. The apparatus can be followed into a thin package for carrying or storage. It can be opened again for use easily.

It will be apparent that various modifications can be made in the particular animal carrier apparatus described in detail above and shown in the drawings within the scope of the invention. The size, configuration and arrangement of components can be changed to meet specific requirements. Also, the locking and towing portions can be different if desired. In addition, other restraining means can be employed. These and other changes can be made in the animal carrier apparatus provided the functioning and operation of the apparatus are not adversely affected. Therefore, the scope of the invention is to be limited only by the following claims.

What is claimed is:

1. Animal carrier apparatus including a base portion, an animal support portion, a locking portion and a towing portion; said base portion including a pair of frame members, each frame member having a generally quadrangular configuration with upper and lower horizontal sections and end sections joining same, said base portion including runner sections extending along the underside of said lower horizontal sections of said frame members and integrally formed therewith, said frame members being pivotally connected to one another, said pivotal connection being along said end sections of said frame members, said pivotal connection being at the same respective location above the center on each end section, said pivotal connection enabling said frame members to be pivotal substantially parallel to each other for compact storage; said animal support portion including spaced flexible transverse strips extending between said upper sections of said frame members and spaced flexible longitudinal strips crossing said transverse strips, said animal support portion including a greater number of transverse strips extending between said upper frame sections than said interlaced longitudinal strips, said transverse strips extending between said upper frame sections being of varying lengths to conform with an animal's under body, restraining means operatively connected to said crossed strips, said restraining means including an animal encircling strap; said locking portion including means for maintaining said frame members in a spread configuration with said transverse strips in an extended condition; said towing portion including continuous flexible connector means, the ends of which are affixed to and extend from forwards ends of said lower horizontal frame members; whereby an animal's legs can be inserted through spaces between said crossed strips with its body held by said restraining means and said locking portion maintaining said frame members spread so said connector means can be utilized to tow said animal.

2. Animal carrier apparatus according to claim 1 wherein said frame members are formed of tubing.

3. Animal carrier apparatus according to claim 1 wherein said frame members have a rectangular configuration with said upper and lower sections thereof being longer than said end section.

4. Animal carrier apparatus according to claim 1 wherein said frame members are pivotally connected through pins extending through corresponding points along said adjoining end sections.

5. Animal carrier apparatus according to claim 1 wherein said flexible strips are fabric or plastic webbing.

6. Animal carrier apparatus according to claim 1 wherein said animal encircling strap includes a hooked fabric fastener.

7. Animal carrier apparatus according to claim 1 wherein said locking portion includes a selectively engageable elongated flexible member.

* * * * *